United States Patent
Huang et al.

(10) Patent No.: US 11,168,213 B2
(45) Date of Patent: Nov. 9, 2021

(54) MOISTURE CURABLE COMPOSITIONS

(71) Applicant: DOW SILICONES CORPORATION, Midland, MI (US)

(72) Inventors: Yanxia Huang, Shanghai (CN); Yi Guo, Shanghai (CN); Xu Chen, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 59 days.

(21) Appl. No.: 16/635,156

(22) PCT Filed: Jul. 30, 2018

(86) PCT No.: PCT/CN2018/000276
§ 371 (c)(1),
(2) Date: Jan. 29, 2020

(87) PCT Pub. No.: WO2019/024430
PCT Pub. Date: Feb. 7, 2019

(65) Prior Publication Data
US 2021/0095078 A1 Apr. 1, 2021

(30) Foreign Application Priority Data
Jul. 31, 2017 (WO) ................ PCT/CN2017/095155

(51) Int. Cl.
*C08G 77/08* (2006.01)
*C08L 83/06* (2006.01)
*C08K 3/011* (2018.01)
*C08L 83/04* (2006.01)

(52) U.S. Cl.
CPC .............. *C08L 83/06* (2013.01); *C08G 77/08* (2013.01); *C08K 3/011* (2018.01); *C08L 83/04* (2013.01); *C08L 2312/08* (2013.01)

(58) Field of Classification Search
CPC ........ C08G 77/42; C08G 77/18; C08G 77/16; C08G 77/08; C08L 83/04; C08L 231/08; C08K 5/544
See application file for complete search history.

(56) References Cited

U.S. PATENT DOCUMENTS

| | | | |
|---|---|---|---|
| 5,492,939 A | 2/1996 | Stanga et al. | |
| 6,204,339 B1 | 3/2001 | Waldman et al. | |
| 2007/0244249 A1 | 10/2007 | Correia | |
| 2010/0009979 A1 | 4/2010 | Wunder | |
| 2016/0340548 A1* | 11/2016 | Gubbels | C09J 5/00 |
| 2018/0016400 A1 | 1/2018 | Gutaker et al. | |

FOREIGN PATENT DOCUMENTS

| | | |
|---|---|---|
| CN | 101864172 A | 10/2010 |
| CN | 101864173 A | 10/2010 |
| CN | 102268234 A | 12/2011 |
| EP | 0802233 A2 | 10/1997 |
| EP | 2106418 A1 | 10/2009 |
| WO | 2005103117 A1 | 11/2005 |
| WO | 2013090127 A1 | 6/2013 |
| WO | 2013100175 A1 | 7/2013 |
| WO | 2013101751 A1 | 7/2013 |
| WO | 2014205251 A2 | 12/2014 |
| WO | 2016081790 A1 | 5/2016 |
| WO | 2016146648 A1 | 9/2016 |

OTHER PUBLICATIONS

International Search Report for PCT/CN2018/000275 dated Oct. 16, 2018, 4 pages.
International Search Report for PCT/CN2018/044372 dated Oct. 22, 2018, 4 pages.
International Search Report for PCT/CN2018/000276 dated Oct. 26, 2018, 4 pages.
Machine-assisted English translation of CN 101864172 obtained from https://worldwide.espacenet.com on Feb. 5, 2020, 14 pages.
Machine-assisted English translation of CN 101864173 obtained from https://worldwide.espacenet.com on Feb. 5, 2020, 14 pages.
Machine-assisted English translation of CN 102268234 obtained from https://worldwide.espacenet.com on Apr. 28, 2020, 18 pages.

* cited by examiner

*Primary Examiner* — Kuo Liang Peng
(74) *Attorney, Agent, or Firm* — Warner Norcross + Judd LLP

(57) ABSTRACT

Disclosed is a two-component silicone composition, which can cure via moisture. The composition generally has improved cure speed while maintaining good storage stability.

15 Claims, No Drawings

MOISTURE CURABLE COMPOSITIONS

CROSS-REFERENCE TO RELATED APPLICATIONS

This application is the National Stage of International Appl. No. PCT/CN2018/000276 filed on 30 July 2018, which claims priority to and all advantages of International Appl. No. PCT/CN2017/095155 filed on 31 July 2017, the content of which is incorporated herein by reference.

This concerns a two part moisture cure organosiloxane composition designed to improve cure speed whilst maintaining storage stability.

Condensation curable organosiloxane compositions, which cure to elastomeric solids, are well known. Typically, such compositions are obtained by mixing a polydiorganosiloxane having reactive terminal groups, e.g. hydroxy groups or hydrolysable groups, with e.g. a silane cross-linking agent which is reactive with the polydiorganosiloxane, for example an acetoxy silane, an oximosilane, an aminosilane or an alkoxysilane in the presence of a suitable catalyst. The resulting compositions are curable upon exposure to atmospheric moisture at room temperature and may be used as structural sealants/adhesives.

In use as sealants and adhesives, it is important that a composition is capable of curing in comparatively thick layers to provide an elastomeric body. It is frequently desirable that the organopolysiloxane composition cures quickly enough to provide a sound seal within several hours but not so quickly that the surface cannot be tooled to desired configuration shortly after application. Dependent on the means of cure (e.g. cross-linker and catalyst) such compositions may be provided to the user in a one part curable product, which can be applied onto a substrate directly or alternatively in a multi-part, typically two part, combination requiring the multiple parts to be mixed together immediately before use.

The properties of Individual parts of said multi-part compositions are generally not affected by atmospheric moisture, but once mixed together the resulting mixture possess excellent deep curability and enables substantially uniform curing throughout the entire body of the sealing material, i.e., from the surface to the inner part. Typically such two part compositions comprise a first component (base) that contains silanol-terminated diorganopolysiloxane and calcium carbonate filler and a second component (catalyst or cure package) containing an alkyl-terminated diorganopolysiloxane, tin based catalyst, cross-linker and adhesion promoter, e.g. a primary aminosilane.

Adhesives for LED lighting often utilise silicone adhesives reliant on hydrosilylation cure because they require high throughput, fast cure and good adhesion to the substrates being adhered together. Such adhesives use platinum catalysts which can be poisoned if they come into contact with other chemicals containing some forms of sulphur, nitrogen and phosphorus. Hence for some LED/electronics applications it would be advantageous to use condensation cure adhesives instead of hydrosilylation cure systems to avoid catalyst poisoning providing cure takes place with sufficient speed.

It is generally acknowledged that the cure speed of two component silicone adhesive/sealant compositions as described above can provide excellent deep curability and enables substantially uniform curing throughout the entire body of the sealing material in quick time compared to most 1 part sealant compositions. It is also appreciated that cure can be accelerated by increasing either or both of the tin catalyst level and the adhesion promoter level. However, with the increase of adhesion promoter, especially in the case of primary amino silanes, the trialkyl-terminated diorganopolysiloxane, used as a carrier in the catalyst package, undergoes random chain scission which causes viscosity to decrease and making the mixture unstable. Also, the ingredients in the catalyst package are not always miscible. This immiscibility may cause the alkyl-terminated diorganopolysiloxane to phase separate by rising to the top of the container, and as a result the silanes and filler in the catalyst package settle to the bottom of the mixture. As a result of the above phase separation, storage stability of the catalyst package may be dramatically impacted. Phase separation is a significant issue for end users. It is extremely messy and time consuming to remix the catalyst package of such two part compositions before use, after a storage period, especially on a large scale as some of the catalysts used can be inflammable thereby causing a potential safety hazard. Furthermore, there is a tendency for carrier fluid e.g. unreactive silicones to accumulate in an upper phase at the top of the material, whilst filler is likely to settle in a silane rich lower phase, rendering re-mixing on a large scale, at least problematic but in extreme cases particularly on an industrial scale, when significant phase separation is evident, can lead to the catalyst package having to be replaced.

Hence, there is a need to provide two part condensation cure adhesives/sealants in which the catalyst package is designed to improve cure speed whilst maintaining storage stability.

There is provided herein a two component moisture curing silicone composition having a base component and catalyst package component in which, the catalyst package comprises:

(i) An ABA, (AB)$_n$ or rake type silicone organic copolymer having at least 2 hydroxy- or alkoxy groups per molecule or a mixture thereof, which comprises organic polymer blocks selected from polyether, hydrocarbon, acrylate, polyurethane or polyurea;

(ii) One or more dipodal silanes in accordance with the formula:

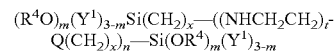

where $R^4$ is a $C_{1-10}$ alkyl group, $Y^1$ is an alkyl groups containing from 1 to 8 carbons, Q is a chemical group containing a heteroatom with a lone pair of electrons; each x is an integer of from 1 to 6, t is 0 or 1; each m is independently 1, 2 or 3 and n is 0 or 1; and (iii) a non-dipodal adhesion promoter;
(iv) a tin based catalyst and optionally
(v) a cross-linker.

Base Component

Any suitable base component may be utilised. For example the base component may comprise:

(a) A siloxane polymer having at least two terminal hydroxyl or hydrolysable groups having a viscosity of from 1000 to 200,000 mPa·s at 25° C.;
(b) One or more reinforcing fillers; and optionally
(c) One or more non-reinforcing fillers Alternatively there is provided herein a two part moisture curing composition having a base component and catalyst package in which, the base component comprises:

(a) A siloxane polymer having at least two terminal hydroxyl or hydrolysable groups having a viscosity of from 1000 to 200,000, alternatively 2000 to 150000 mPa·s at 25° C.;

(b) One or more reinforcing fillers; and optionally
(c) One or more non-reinforcing fillers
and
the catalyst package comprises
  (i) An ABA, $(AB)_z$ or rake type silicone organic copolymer having at least 2 hydroxy- or alkoxy groups per molecule or a mixture thereof, which comprises organic polymer blocks selected from polyether, hydrocarbon, acrylate, polyurethane or polyurea;
  (ii) One or more dipodal silanes in accordance with the formula: $(R^4O)_m(Y^1)_{3-m}$—Si(CH$_2$)$_x$—(NHCH$_2$CH$_2$)$_t$-Q(CH$_2$)$_x$—Si(OR$^4$)$_m$(Y$^1$)$_{3-m}$, where R$^4$ is a C$_{1-10}$ alkyl group, Y$^1$ is an alkyl groups containing from 1 to 8 carbons, Q is a chemical group containing a heteroatom with a lone pair of electrons; each x is an integer of from 1 to 6, t is 0 or 1 and each m is independently 1, 2 or 3;
and
  (iii) a non-dipodal adhesion promoter;
  (iv) a tin based catalyst and optionally
  (v) a cross-linker.

Unless otherwise indicated all viscosity measurements were determined by using a Brookfield® cone plate viscometer (RV DIII) using cone plate CP-52 for viscosities of 40,000 mPa·s and below and cone plate CP-41 for materials having viscosities greater than 40,000 mPa·s adapting the speed according to the polymer viscosity and all viscosity measurements were taken at 25° C. unless otherwise indicated.

The base component comprises may comprise (a) a siloxane polymer having at least two terminal hydroxyl or hydrolysable groups having a viscosity of from 1000 to 200,000 at 25° C., alternatively 2000 to 150000mPa·s at 25° C. The siloxane polymer (a) may be described by the following molecular Formula (1)

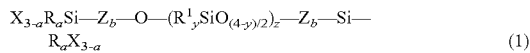

(1)

where
a is 0, 1, 2 or 3,
b is 0 or 1,
z is an integer from 300 to 5000 inclusive,
y is 0, 1 or 2 preferably 2.

At least 97% (i.e. from 97% to 100%) of the $R^1_y SiO_{(4-y)/2}$ are characterized with y=2.

X is a hydroxyl group or any condensable or any hydrolyzable group,

Each R is individually selected from aliphatic organic groups selected from alkyl, aminoalkyl, polyaminoalkyl, epoxyalkyl or alkenyl alternatively alkyl, aminoalkyl, polyaminoalkyl, epoxyalkyl groups having, in each case, from 1 to 10 carbon atoms per group or alkenyl groups having in each case from 2 to 10 carbon atoms per group or is an aromatic aryl group, alternatively an aromatic aryl group having from 6 to 20 carbon atoms and Most preferred are the methyl, ethyl, octyl, vinyl, allyl and phenyl groups.

Each $R^1$ is individually selected from the group consisting of X, alkyl groups, alternatively alkyl groups having from 1 to 10 carbon atoms, alkenyl groups alternatively alkenyl groups having from 2 to 10 carbon atoms and aromatic groups, alternatively aromatic groups having from 6 to 20 carbon atoms. Most preferred are methyl, ethyl, octyl, trifluoropropyl, vinyl and phenyl groups. It is possible that some $R^1$ groups may be siloxane branches off the polymer backbone which may have terminal groups as hereinbefore described.

Most preferred $R^1$ is methyl.

Each X group of siloxane polymer (a) may be the same or different and can be a hydroxyl group or a condensable or hydrolyzable group. The term "hydrolyzable group" means any group attached to the silicon which is hydrolyzed by water at room temperature. The hydrolyzable group X includes groups of the Formula —OT, where T is an alkyl group such as methyl, ethyl, isopropyl, octadecyl, an alkenyl group such as allyl, hexenyl, cyclic groups such as cyclohexyl, phenyl, benzyl, beta-phenylethyl; hydrocarbon ether groups, such as 2-methoxyethyl, 2-ethoxyisopropyl, 2-butoxyisobutyl, p-methoxyphenyl or —(CH$_2$CH$_2$O)$_2$CH$_3$; or any N,N-amino radical, such as dimethylamino, diethylamino, ethylmethylamino, diphenylamino or dicyclohexylamino.

The most preferred X groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy radicals, such as methoxymethoxy or ethoxymethoxy and alkoxyaryloxy, such as ethoxyphenoxy. The most preferred alkoxy groups are methoxy or ethoxy.

Each Z is independently selected from an alkylene group having from 1 to 10 carbon atoms. In one alternative each Z is independently selected from an alkylene group having from 2 to 6 carbon atoms; in a further alternative each Z is independently selected from an alkylene group having from 2 to 4 carbon atoms.

Siloxane polymer (a) of the base component can be a single siloxane represented by Formula (1) or it can be mixtures of siloxanes represented by the aforesaid formula. The term "siloxane polymer mixture" in respect to component (a) of the base component is meant to include any individual siloxane polymer (a) or mixtures of siloxane polymers (a). As used herein, the term "silicone content" means the total amount of silicone used in the base component and the catalyst package, irrespective of the source, including, but not limited to the siloxane polymer (a), polymer mixtures, and/or resins.

The Degree of Polymerization (DP), (i.e. in the above formula substantially z), is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) with precision of about 10-15%. This technique is standard and yields Mw, Mn and polydispersity index (PI). The degree of polymerisation (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity. Siloxane polymer (a) is going to be present in an amount of from 20 to 90%, alternatively 20 to 80% by weight of the base composition, alternatively from 35 to 65% by weight of the base composition.

The reinforcing filler (b) of the base component may contain one or more finely divided, reinforcing fillers such as calcium carbonate, high surface area fumed silica and/or precipitated silica including, for example, rice hull ash. Typically, the surface area of the reinforcing filler (b) is at least 50 m$^2$/g. In the case of high surface area fumed silica and/or high surface area precipitated silica, these may have surface areas of, for example, from 100 to 400 m$^2$/g measured in accordance with the BET method, alternatively of from 100 to 300 m$^2$/g in accordance with the BET method. Typically the reinforcing fillers are present in the base composition in an amount of from 10 to 80 wt. % of the base composition, alternatively 20 to 70% by weight, alternatively from 35 to 65% by weight.

The optional non-reinforcing filler (c) of the base component may comprise non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Aluminium oxide, silicates from the group consisting of olivine group; garnet group; aluminosilicates; ring silicates; chain silicates; and sheet silicates. The olivine group comprises silicate minerals, such as but not limited to, forsterite and Mg$_2$SiO$_4$. The garnet group comprises ground silicate minerals, such as but not limited to, pyrope; Mg$_3$Al$_2$Si$_3$O$_{12}$; grossular; and Ca$_2$Al$_2$Si$_3$O$_{12}$. Aluninosilicates comprise ground silicate minerals, such as but not limited to, sillimanite; Al$_2$SiO$_5$ ; mullite; 3Al$_2$O$_3$.2SiO$_2$; kyanite; and Al$_2$SiO$_5$ The ring silicates group comprises silicate minerals, such as but not limited to, cordierite and Al$_3$(Mg,Fe)$_2$[Si$_4$AlO$_{18}$]. The chain silicates group comprises ground silicate minerals, such as but not limited to, wollastonite and Ca[SiO$_3$].

The sheet silicates group comprises silicate minerals, such as but not limited to, mica; K$_2$Al$_{14}$[Si$_6$Al$_2$O$_{20}$](OH)$_4$; pyrophyllite; Al$_4$[Si$_8$O$_{20}$](OH)$_4$; talc; Mg$_6$[Si$_8$O$_{20}$](OH)$_4$; serpentine for example, asbestos; Kaolinite; Al$_4$[Si$_4$O$_{10}$](OH)$_8$; and vermiculite. The optional non-reinforcing filler, when present, is present in an amount up to 20% by weight of the base.

In addition, a surface treatment of the reinforcing filler (b) of the base component and optional non-reinforcing filler (c) of the base component may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components The surface treatment of the fillers makes them easily wetted by siloxane polymer (a) of the base component. These surface modified fillers do not clump, and can be homogeneously incorporated into the silicone polymer (i) of the base component. This results in improved room temperature mechanical properties of the uncured compositions.

The proportion of such fillers when employed will depend on the properties desired in the elastomer-forming composition and the cured elastomer. Filler (b) is going to be present in an amount of from 10 to 80% by weight of the base composition.

Catalyst Package

It was found that increasing cure speed by introducing additional primary amine based adhesion promoters and or tin catalyst did indeed lead to unreactive siloxane carrier in the catalyst package becoming unstable and being degrading causing reductions in the viscosity of the catalyst package and storage instability. However, the catalyst package described herein was developed and provided the required cure speed improvements while not degrading.

As hereinbefore described the catalyst package of the two component composition comprises (i) an ABA, (AB)$_z$ or rake type silicone organic copolymer having at least 2 hydroxy- or alkoxy groups per molecule or a mixture thereof, which organic polymer blocks is/are selected from polyethers, hydrocarbon polymers, acrylate polymers, polyurethanes or polyureas. The silyl groups may be selected from alkoxydialkylsilyl, dialkoxyalkylsilyl or trialkoxysilyl terminal groups.

The ABA type copolymers which may be utilised in the above typically have two siloxane end blocks and an organic block selected from the above which may take the form of MDZ$^1$DM; wherein M represents R$^2_d$(R$^1$)$_{d-3}$SiO$_{1/2}$;

D represents a block of units of the formula (R$^3$)$_2$SiO$_{2/2}$; and

Z$^1$ represents is a divalent organic group selected from units of selected from polyethers, hydrocarbon polymers, acrylate polymers, polyurethanes or polyureas.

Each R$^1$ and each R$^3$ may be the same or different and may be selected from a hydrocarbon group having from 1 to 18 carbon atoms, a substituted hydrocarbon group having from 1 to 18 carbon atoms or a hydrocarbonoxy group having up to 18 carbon atoms and has, on average, a value of from 1 to 3, preferably 1.8 to 2.2.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Particularly preferred examples of groups R$^1$ and R$^3$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Preferably, at least some and more preferably substantially all of the R$^1$ and R$^3$ groups are methyl. Preferably D is a linear block of polydialkylsiloxane units, most preferably polydimethylsiloxane.

R$^2$ is an alkoxy group having from 1 to 6 carbon atoms, alternatively a methoxy or ethoxy group, alternatively a methoxy group.

(AB)n silicone organic copolymers are copolymers wherein blocks of a siloxane units and organic units repeat to form the copolymer but in the present case have M terminal groups and as such may be depicted as M(DZ$^1$)$_z$M Wherein M, D and Z$^1$ are as described above and z is an integer ≥2.

Alternatively the copolymer may take the form of a "rake" copolymer where a predominately linear polyorganosiloxane provides the "backbone" of the copolymer architecture with pendant organic blocks forming the rake which may depicted as MD$^1_x$D$^2_y$M Wherein M is as defined above and $D^1$ represents a unit of the formula $(R^3)_2SiO_{2/2}$, and $D^2$ represents a unit of the formula $(R^3)(Z^2)SiO_{2/2}$, wherein $Z^2$ represents a monovalent organic block having terminal —OH or $R^2$ groups, alternatively terminal —OH groups selected from units of polyethers, hydrocarbon polymers, acrylate polymers, polyurethanes or polyureas and $R^3$ is as described above.

In one alternative when the copolymers are ABA or $(AB)_z$ type copolymers as described above, d is 1, 2 or 3 and for rake copolymers d is zero, 1, 2 or 3, alternatively zero or 1, alternatively zero.

As previously indicated the organic polymer blocks suitable for the copolymer backbone as hereinbefore described, e.g. $Z^1$ in the case of ABA or (AB)n type copolymers is/are selected from polyethers, hydrocarbon polymers, acrylate polymers, polyurethanes.

One preferred type of organic polymer block which can be used as $Z^1$ is an acrylate polymer backbone. The acrylate polymer is an addition polymerised polymer of acrylate and/or methacrylate ester monomers, which comprise at least 50% by weight of the monomer units in the acrylate polymer. Examples of acrylate ester monomers are n-butyl, isobutyl, n-propyl, ethyl, methyl, n-hexyl, n-octyl and 2-ethylhexyl acrylates. Examples of methacrylate ester monomers are n-butyl, isobutyl, methyl, n-hexyl, n-octyl, 2-ethylhexyl and lauryl methacrylates. The acrylate polymer block preferably has a glass transition temperature (Tg) below ambient temperature; acrylate polymers are generally preferred over methacrylates since they form lower Tg polymers. Polybutyl acrylate blocks of $Z^1$ are particularly preferred. The acrylate polymer can contain lesser amounts of other monomers such as styrene, acrylonitrile or acrylamide. The acrylate(s) can be polymerized by various methods such as conventional radical polymerization, or living radical polymerization such as atom transfer radical polymerization, reversible addition—fragmentation chain transfer polymerization, or anionic polymerization including living anionic polymerisation.

Other suitable types of organic polymer blocks for $Z^1$ polyisobutylene blocks.

In one alternative $Z^1$ is a polyether. Such polyether blocks may comprise recurring oxyalkylene units, illustrated by the average formula $(-C_nH_{2n}-O-)_y$, wherein n is an integer from 2 to 4 inclusive and y is an integer of at least four. The number average molecular weight of each polyether block may range from about 300 to about 10,000. Moreover, the oxyalkylene units are not necessarily identical throughout the polyoxyalkylene, but can differ from unit to unit. A polyoxyalkylene, for example, can comprise oxyethylene units ($-C_2H_4-O-$), oxypropylene units ($-C_3H_6-O-$) or oxybutylene units ($-C_4H_8-O-$), or mixtures thereof. Preferably the polyoxyalkylene polymeric backbone consists essentially of oxyethylene units or oxypropylene units. Other polyoxyalkylene blocks may include for example: units of the structure:

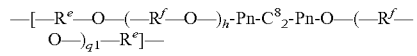

in which Pn is a 1,4-phenylene group, each $R^e$ is the same or different and is a divalent hydrocarbon group having 2 to 8 carbon atoms, each $R^f$ is the same or different and is an ethylene group or propylene group, each $R^g$ is the same or different and is a hydrogen atom or methyl group and each of the subscripts h and q1 is a positive integer in the range from 3 to 30.

One preferred type of polyether block for use as $Z^1$ is a polyoxyalkylene polymer block comprising recurring oxyalkylene units of the formula ($-C_nH_{2n}-O-$) wherein n is an integer from 2 to 4 inclusive, as described above in connection with siloxane polyoxyalkylene block copolymers.

Generally, the end of each polyoxyalkylene block $Z^1$ is linked to a siloxane block by a divalent organic group. This linkage is determined by the reaction employed to prepare the block silicone polyether copolymer. The divalent organic groups at the ends of $Z^1$ may be independently selected from divalent hydrocarbons containing 2 to 30 carbons and divalent organofunctional hydrocarbons containing 2 to 30 carbons. Representative, non-limiting examples of such divalent hydrocarbon groups include; ethylene, propylene, butylene, pentylene, hexylene, heptylene, octylene, and the like. Representative, non-limiting examples of such divalent organofunctional hydrocarbons groups include acrylate and methacrylate. In one alternative the divalent hydrocarbon groups include; ethylene, propylene, butylene, pentylene, hexylene, heptylene or octylene, alternatively ethylene, propylene, butylene.

The viscosity of the ABA or (AB)n type block silicone polyether copolymers is preferably between from 1000 mPa·s to 200,000 mPa·s at 25° C. using a Brookfield® cone plate viscometer (RV DlE) using cone plate CP-52 for viscosities of 40,000 mPa·s and below and cone plate CP-41 for materials having viscosities greater than 40,000 mPa·s adapting the speed according to the polymer viscosity and all viscosity measurements were taken at 25° C. unless otherwise indicated.

When the copolymer is a rake copolymer, it is preferred that the organic component $Z^2$ is a polyether-containing substituent comprising recurring oxyalkylene units of the formula ($-C_nH_{2n}-O-$) wherein n is an integer from 2 to 4 inclusive. The polyether-containing substituent may be linked to a silicon atom in the polymer backbone chain via a divalent organic group as described above for $Z^1$ and has a terminal —OH or alkoxy group, wherein the alkoxy group has from 1 to 6 carbon atoms, alternatively —OH or a methoxy or ethoxy group, alternatively an —OH group. Typically the polyether side chains in such rake copolymers will contain from 2 to 150 alkylene oxide units per side chain.

Basically, the cure speed of this type of two component silicone sealants can be accelerated with increased tin catalyst level and amino silane level in catalyst package composition. However, with the increase of amino silane level in catalyst package, the PDMS in catalyst package matrix tends to degrade with time past and then cause significant viscosity decrease. Also, with high level of amino silane in the catalyst package formulation, the matrix is easy to be separated due to poor compatibility of the silane and PDMS. As a results of the above phenomena, the storage stability of the catalyst package material will be dramatically impacted. With the solution from our study, we could solve the storage stability issue, but still achieving the fast cure performance. In our finding, we used different types of amino silanes at high level to speed up the curing speed and alkoxyl silane terminated polyether to stabilize the product shelf-life. Typically the alkoxy silyl terminated organic polymer (i), is present in the catalyst package as a carrier and is present in the catalyst package in an amount of from 30 to 80% weight, alternatively 40 to 65 weight % of the total weight of the catalyst package.

The catalyst package of the two component composition also contains one or more dipodal silanes (ii). The dipodal silanes of the catalyst package can be defined by the following formula:

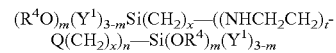

where $R^4$ is a $C_{1-10}$ alkyl group, $Y^1$ is an alkyl groups containing from 1 to 8 carbons, Q is a chemical group containing a heteroatom with a lone pair of electrons, alternatively an amine or a urea; each x is an integer of from 1 to 6, t is 0 or 1; each m is independently 1, 2 or 3, alternatively 2 or 3, in a further alternative m=3.

In one alternative Q is a secondary amine and each x is from 2 to 4.

Examples of dipodal Silane (ii) include: bis (trialkoxysilylalkyl)amines, bis (dialkoxyalkylsilylalkyl)amine, bis (trialkoxysilylalkyl) N-alkylamine, bis (dialkoxyalkylsilylalkyl) N-alkylamine and bis (trialkoxysilylalkyl)urea and bis (dialkoxyalkylsilylalkyl) urea.

Specific suitable examples include example bis (3-trimethoxysilylpropyl)amine, bis (3-triethoxysilylpropyl) amine, bis (4-trimethoxysilylbutyl)amine, bis (4-triethoxysilylbutyl)amine, bis (3-trimethoxysilylpropyl)N-methylamine, bis (3-triethoxysilylpropyl) N-methylamine, bis (4-trimethoxysilylbutyl) N-methylamine, Bis (4-triethoxysilylbutyl) N-methylamine, Bis (3-trimethoxysilylpropyl)urea, Bis (3-triethoxysilylpropyl)urea, Bis (4-trimethoxysilylbutyl)urea, Bis (4-triethoxysilylbutyl)urea, bis (3-dimethoxymethylsilylpropyl)amine, bis (3-diethoxymethyl silylpropyl)amine, bis (4-dimethoxymethylsilylbutyl)amine, bis (4-diethoxymethyl silylbutyl)amine, bis (3-dimethoxymethylsilylpropyl) N-methylamine, bis (3-diethoxymethyl silylpropyl) N-methylamine, bis (4-dimethoxymethylsilylbutyl) N-methylamine, bis (4-diethoxymethyl silylbutyl) N-methylamine, bis (3-dimethoxymethylsilylpropyl)urea, bis (3-diethoxymethyl silylpropyl)urea, bis (4-dimethoxymethylsilylbutyl)urea, bis (4-diethoxymethyl silylbutyl)urea, bis (3-dimethoxyethylsilylpropyl)amine, bis (3-diethoxyethyl silylpropyl)amine, bis (4-dimethoxyethylsilylbutyl)amine, bis (4-diethoxyethyl silylbutyl)amine, bis (3-dimethoxyethylsilylpropyl) N-methylamine, bis (3-diethoxyethyl silylpropyl) N-methylamine, bis (4-dimethoxyethylsilylbutyl) N-methylamine, bis (4-diethoxyethyl silylbutyl) N-methylamine, bis (3-dimethoxyethylsilylpropyl)urea bis (3-diethoxyethyl silylpropyl)urea, bis (4-dimethoxyethylsilylbutyl)urea and/or bis (4-diethoxyethyl silylbutyl)urea.

In a still further alternative The dipodal silanes are of the formula:

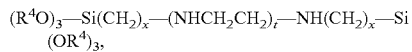

$(R^4O)_3—Si(CH_2)_x—(NHCH_2CH_2)_t—NH(CH_2)_x—Si(OR^4)_3$,

In which case the dipodal silane may be selected from a bis (trialkoxysilylalkyl) amine such as bis (3-tripropyloxysilylpropyl)amine, bis (3-methyldiethoxysilypropyl)amine, bis (3-methyldimethoxysilypropyl)amine, as well as bis (3-triethoxysilylpropyl)amnine

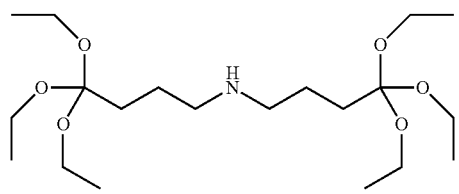 [SMILES: CCOC(CCCNCCCC(OCC)(OCC)OCC)(OCC)OCC]

or bis (3-trimethoxysilylpropyl)amine

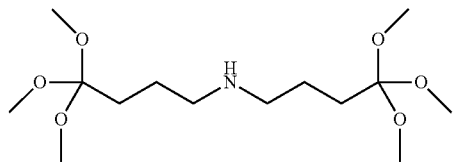

Alternatively the dipodal silane may be a bis (trialkoxysilylalkyl) alkylenediamine such as N,N'-bis ((3-trimethoxysilyl)propyl]ethylenediamine

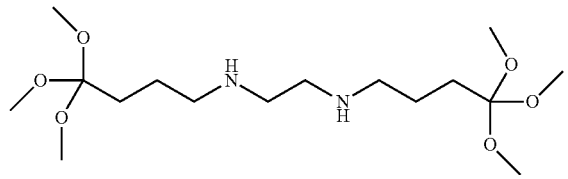

The dipodal silane (ii) is compatible with the polydialkylsiloxane (i) in the catalyst package.

Two part compositions of the type herein provide a fast deep cure and as such adhesion promoters are an essential ingredient in such compositions to ensure speed of cure and, of course, adhesion to the substrate surface to which the composition is to be applied The dipodal silanes (ii) may be present in the catalyst package in an amount of from 5 to 50 weight %, alternatively 10 to 30 weight %. Dipodal silane (ii) may function as a cross-linker as well as the adhesion promoter and as such no additional cross-linker is provided as an essential ingredient. However, additional cross-linkers may be provided where deemed appropriate.

Non-Dinodal Adhesion Promoters (iii)

Examples of non-dipodal adhesion promoters (v) which may optionally be incorporated in the catalyst package for the two component moisture curing silicone compositions described herein include alkoxysilanes such as (ethyl enediaminepropyl)trimethoxy silane, aminoalkylalkoxysilanes, for example gamma-aminopropyltriethoxysilane or gamma-aminopropyltrimethoxysilane, epoxyalkylalkoxysilanes, for example, 3-glycidoxypropyltrimethoxysilane and, glycidoxypropyltriethoxysilane, mercapto-alkylalkoxysilanes, and reaction products of ethylenediamine with silylacrylates. Isocyanurates containing silicon groups such as 1,3,5-tris(trialkoxysilylalkyl) isocyanurates may additionally be used. Further suitable adhesion promoters (v) are reaction products of epoxyalkylalkoxysilanes such as 3-glycidoxypropyltrimethoxysilane with amino-substituted alkoxysilanes such as 3-aminopropyltrimethoxysilane and optionally with alkylalkoxysilanes such as methyltrimethoxysilane. Typically these are present in a range of from 1 to 25 weight % of non-dipodal adhesion promoter (iii), alternatively 2 to 20 weight % of the catalyst package to enhance adhesion in combination with the dipodal silanes (ii).

Catalyst (iv)

The fourth essential ingredient in the catalyst package is a suitable tin based condensation catalyst (iv) which is for use as the catalyst for the cure reaction subsequent to mixing the base component and catalyst package component together. Examples include tin triflates, organic tin metal catalysts such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate, dibutyltin dibenzoate, stannous octoate, dimethyltin dineodecanoate (DMTDN) and dibutyltin dioctoate. The tin catalyst may be present in an amount of from 0.01 to 3 weight %; alternatively 0.1 to 0.5 weight % of the catalyst package.

The catalyst package may also include one or more of cross-linkers (v), pigments (vi) and fillers (vii).

Cross-Linker (v)

Any suitable cross-linker may be used as cross-linker (v), if required. When present the crosslinker (v) in the curable composition as hereinbefore described may be one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, iso-butoxy and propoxy) and alkenyloxy groups (for example isopropenyloxy and 1-ethyl-2-methylvinyloxy).

In the case of siloxane based cross-linkers (v), when present, in the catalyst package the molecular structure can be straight chained, branched, or cyclic.

When present, the crosslinker (v) of the catalyst package preferably has at least three or four silicon-bonded condensable (preferably hydroxyl and/or hydrolysable) groups per molecule which are reactive with the condensable groups of siloxane polymer (a) in the base component. When crosslinker (v) of the catalyst package is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as crosslinkers include bis (trimethoxysilyl)hexane, 1,2-bis (triethoxysilyl) ethane, alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyltripropionoxysilane, methyltris(methylethylketoximo) silane, vinyl-tris-methylethylketoximo)silane, methyltris (methylethylketoximino)silane, methyltris(isopropenoxy) silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above. For example the catalyst package may comprise from 1 to 30 weight % of cross-linker (iii), alternatively 5 to 25 weight %.

Pigments (vi)

Pigments are utilised to colour the composition as required. Any suitable pigment may be utilised providing it is compatible with the composition. In two part compositions pigments and/or coloured (non-white) fillers e.g. carbon black may be utilised in the catalyst package to colour the end sealant product. When present carbon black will function as both filler and colorant.

Fillers (vii)

One of the fillers used in the base component may also be used in the catalyst package if/when deemed appropriate. Silica, e.g. fumed silica and/or calcium carbonate being preferred. Fillers (vii) may be present in the catalyst package in an amount of from 0 to 50 weight % depending on the mixing ratio of the two parts of the composition. Other additives may be used if necessary. These may include heat stabilizers, flame retardants, UV stabilizers, cure modifiers, electrically conductive fillers, heat conductive fillers, and fungicides and/or biocides and the like.

Biocides

Biocides may additionally be utilized in the composition if required. It is intended that the term "biocides" includes bactericides, fungicides and algicides, and the like. Suitable examples of useful biocides which may be utilised in compositions as described herein include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds andisothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl] methyl]-1H-1,2,4-triazole.

The fungicide and/or biocide may suitably be present in an amount of from 0 to 0.3% by weight of the composition and may be present in an encapsulated form where required such as described in EP2106418.

In the case of 2 part compositions the base component comprises:

10 to 90% weight of siloxane polymer (a);
10 to 80 weight % reinforcing fillers (b);
0 to 20 Weight % of non-reinforcing fillers (c);
with the total weight % of the base component being 100 weight % and in the catalyst package:
30 to 80% weight of alkoxy silyl terminated organic polymer (i),is present in the catalyst package as a carrier and is present in the catalyst package in an amount of from 30 to 80% weight, alternatively 40 to 65 weight % of the total weight of the catalyst package; 5 to 50 weight % of dipodal silanes (ii), alternatively 10 to 30 weight % of dipodal silanes (ii),
5 to 25 weight % of non-dipodal adhesion promoter (iii), alternatively 2 to 20 weight %
to 3 weight % of tin based catalyst; alternatively 0.1 to 0.5 weight % of tin based catalyst (iv);
0 to 25 weight % of cross-linker (v), alternatively 2 to 20 weight %;
with the total weight % of the catalyst package being 100 weight %.

In the case of 2 part sealant compositions, the components of each part are mixed together in amounts within the ranges given above and then the base component composition and the catalyst package composition are inter-mixed in a pre-determined ratio e.g. from 15:1 to 1:1, alternatively from 14:1 to 5:1 alternatively from 14:1 to 7:1. If the intended mixing ratio of the base component: catalyst package is 15:1 or greater then no filler will be generally utilized in the catalyst package. However if the intended mixing ratio of the base component:catalyst package is less than 15:1 an increasing amount filler will be utilized in the catalyst package up to the maximum of 50% weight of the catalyst package, if the intended ratio is 1:1. The moisture curable compositions can be prepared by mixing the ingredients employing any suitable mixing equipment.

Resulting compositions may be employed in a variety of applications, for example as an adhesive for electronic applications e.g. for LED lamps, general bonding and as a pottant and the like. Other applications include uses involving coating, caulking, mold making and encapsulating materials. For example, as a sealant for structural glazing, insulating glazing, solar applications, in industrial assembly and/or as an insulating glass sealant. It may also be used for weather proofing.

There is also provided herein an insulating glass unit and/or building façade element e.g. a shadow box and/or structural glazing unit and/or a gas filled insulation construction panel which in each case is sealed with a sealant cured from the silicone sealant composition as hereinbefore described.

Use of the sealant composition as described above as an insulating glass sealant e.g. for structural glazing, as a sealant for LED lighting and other electrical applications and/or as a sealant in an oven and/or as a structural coating on a substrate.

EXAMPLES

Example 1

The intention herein was to provide a condensation cure adhesive/sealant for LED lamp substrates as an alternative to hydrosilylation cured materials to improve the strength of adhesion between substrates. Two part condensation cure adhesives/sealants provide fast deep section cure (over 90% of strength over 24 hours) and have a typical snap time of between 20~120 min), good adhesion to most substrates. They have the added advantage that the tin catalysts used to cure such compositions are not inactivated by other chemicals containing e.g. sulphur, and phosphorus. In order to be suitable for LED lighting applications it was needed to significantly reduce the snap time to between 3~6 min, and adhesion and strength build up need to be quick enough within 30 min.

The catalyst package composition is provided in Table 1a. Two base compositions were utilised for the present examples, identified as base (1) and Base (2) in Table 1b. In respect to this example base (1) was utilised.

TABLE 1a

| Catalyst Package | Comp. 1 (wt. %) |
| --- | --- |
| Trimethoxysilylethylene terminated polydimethylsiloxane, viscosity = 30,000 mPa · s @ 25° C. | 52.5 |
| 2,2,4,4,6,6-Hexamethylcyclotrisilazane | 0.5 |
| Treated Fumed silica | 3.50 |
| 1,6-Bis (trimethoxysilyl)hexane | 20 |
| aminopropyltriethoxysilane | 16 |
| bis (3-trimethoxysilylpropyl)amine | 7 |
| Dimethyl TIN Dineodecanoate | 0.275 |

TABLE 1b

| Base Component | Base 1 (wt. %) | Base 2 (wt. %) |
| --- | --- | --- |
| Treated precipitated calcium carbonate | 49.5 | 50 |
| Hydroxydimethyl terminated polydimethylsiloxane viscosity of 4000 mPa · s @ 25° C. | 50.5 | 50 |

The viscosity over time of the catalyst package was determined using a Brookfield® cone plate viscometer (RV DII) using cone plate CP-41 at either 1 rpm or 5 rpm. Measurements were taken at 25° C. unless otherwise indicated. Results noted over time for samples aged at room temperature are provided in Table 1c and results noted over time after aging at a temperature of 50° C. are provided in Table 1d.

TABLE 1c

| | Fresh | 3 Month aging at Room temp. | 5 Month aging at Room temp. |
| --- | --- | --- | --- |
| Appearance | OK | OK | Pates material stored in glass bottle showed some cracks after 4 Month of storage |
| viscosity (mPa · s) using cone plate CP-41 at 1 rpm | 14150 | 6779 | 4617 |
| viscosity (mPa · s) using cone plate CP-41 at 5 rpm | 8802 | 3390 | 1611 |

TABLE 1d

| | Fresh | 2 weeks aging at 50° C. | 4 weeks aging at 50° C. | 6 weeks aging at 50° C. | 8 weeks aging at 50° C. |
| --- | --- | --- | --- | --- | --- |
| Viscosity(mPa · s) using cone plate CP-41 at 1 rpm for 3 minutes | 14150 | 8449 | 5796 | 4814 | 5207 |
| Viscosity(mPa · s) using cone plate CP-41 at 5 rpm for 3 minutes | 8802 | 3910 | 2299 | 1709 | 1709 |

Snap Time

After each time period identified in Table 1d the catalyst package analysed was mixed with the base (1) of Table 1b above and the snap time was determined and values are provided in Table 1e below.

Snap time is measured by gently touching at regular time intervals (typically 2-3 min) a spatula on the surface of the curing composition. As the cure progresses, the coating gains viscosity and elasticity. When these two are sufficiently high, the coating "snaps off" the spatula. The time elapsed between the casting of the coating and the first observation of the snap-off effect is recorded as snap time. This value has practical importance, because it provides an indication about the working time of the coating. The working time is defined as the time which the applicator is able to work with the material before the latter reaches a state of sufficiently high viscosity which prevents it from being properly handled and tooled. Snap time is used as a rough estimation of the working time. In this case base 2 was mixed with the catalyst package for the measurement of snap time.

TABLE 1e

|  | Fresh | 2 weeks aging at 50° C. | 4 weeks aging at 50° C. | 6 weeks aging at 50° C. | 8 weeks aging at 50° C. |
|---|---|---|---|---|---|
| snap time (min) | 5.5' | 7.08 | 7.17 | 6.83 | 6.5 |

It was identified in Example 1 that whilst the addition of higher levels of primary amino silane and bis (3-trimethoxysilylpropyl)amine adhesion promoters certainly enhanced snap times, they met other complications in that the high levels of adhesion promoter used lead to destabilizing of the siloxane polymer carrier in the catalyst package leading to a significant reduction of viscosity of the catalyst package, i.e. poor storage stability.

Example 2

In this example the stability of two catalyst packages Ex. 1 and Ex. 2 as hereinbefore described are compared with those of a prior art unreactive silicone carrier material accordance with the invention. The composition of the catalyst packages used are provided in Table 2a. The silicone polyether used was a rake type copolymer as hereinbefore described in the form of a trimethylsiloxy terminated dimethyl methyl polyether siloxane. The polyether side chain was an —OH terminated (propyl(poly(EO)(PO)) chain. The silicone polyether consisted of 18 weight % of siloxane groups, 35 weight % oxyethylene units and 46 weight % of oxypropylene groups and had a weight average molecular weight (Mw) of 27900 (GPC) and a viscosity at 25° C. of 2305 cSt determined by measuring the time required for a fixed volume of samples to pass through a calibrated glass capillary using "gravity-flow" based on ASTM D-445.

TABLE 2a

|  | Ex. 1 (wt. %) | Ex. 2 (wt. %) | Comp. 2 (wt. %) |
|---|---|---|---|
| Silicone polyether | 59.2 | 57.7 |  |
| Trimethyl terminated polydimethylsiloxane 60,000 mPa · s @ 25° C. |  |  | 60.70 |
| 2,2,4,4,6,6-Hexamethylcyclotrisilazane | 0 | 1.5 | 0.50 |
| Treated Fumed silica | 3.5 | 3.5 | 3.50 |
| 1,6-Bis (trimethoxysilyl)hexane | 14 | 14 | 14.00 |
| aminopropyltriethoxysilane | 16 | 16 | 16.00 |
| bis (3-trimethoxysilylpropyl)amine | 7 | 7 | 5.00 |
| Dimethyl TIN Dineodecanoate | 0.3 | 0.3 | 0.30 |
|  | 100.00 | 100.00 | 100.00 |

Catalyst Package Preparation

The catalyst package of Ex. 1 was prepared by mixing the silicone polyether and silica into a base formulation and then heating the resulting base formulation to approximately 110° C. under vacuum to remove moisture for approximately 1 hour. The resulting "anhydrous" base was then allowed to cool to about 30° C. and the remaining ingredients were introduced and thoroughly mixed.

The catalyst package of Ex. 2 was prepared by first mixing the silicone polyether with the hexamethylcyclotrisilazane (used to react with moisture contained by the silicone polyether) followed by the silica to make a base formulation. The base formulation was then heated to approximately 110° C. under vacuum to remove moisture for approximately 1 hour. The resulting "anhydrous" base was then allowed to cool to about 30° C. and the remaining ingredients were introduced and thoroughly mixed.

The viscosity over time of the catalyst package was determined, unless otherwise indicated) using a Brookfield® cone plate viscometer (RV DIII) using cone plate CP-41 at 5 rpm. Measurements were taken at 25° C. unless otherwise indicated. Results noted over time for samples aged at room temperature and results noted over time after aging at a temperature of 50° C. are provided in Table 2b.

TABLE 2b

|  | Viscosity Ex. 1 (mPa · s) | Viscosity Ex. 2 (mPa · s) | Viscosity Comp. 3 (mPa · s) |
|---|---|---|---|
| Fresh at Room temperature (RT) | 1965 | 2201 | 36742 (measured at 1 rpm as the viscosity will be out of the measurement range if measure at 5 rpm) |
| Aging for 1 week at RT |  |  | 17349 |
| Aging for 1 month at RT |  |  | 11258 |
| Aging for 4 month at RT | 1120 | 963 |  |
| Aging for 1 week at 50° C. |  |  | 6464 |
| Aging for 2 weeks at 50° C. | 2220 | 884 | 6307 |
| Aging for 4 weeks at 50° C. | 2869 | 844 | 2731 |
| Aging for 8 weeks at 50° C. | 844 | 805 |  |

It will be appreciated that the compositions using Ex. 1 and Ex. 2as the catalyst package retained reasonably constant measurements for viscosity over time after both room temperature and high temperature aging. Given these results weight average molecular weight values were determined for the polyethers and siloxane in the compositions different polymer carriers using gel permeation chromatography. The results are depicted in Table 2c.

TABLE 2c

|  | Ex. 1 Mw | Ex. 2 Mw | Comp. 3 Mw |
|---|---|---|---|
| Fresh | 29704 | 29808 | 107164 |
| Aging for 1 month at RT |  |  | 82176 |
| Aging for 4 months at RT | 29018 | 30383 |  |
| Aging for 1 week at 50° C. |  |  | 67179 |
| Aging for 2 weeks at 50° C. | 29221 | 29349 | 47704 |
| Aging for 4 weeks at 50° C. | 29257 | 30056 | 36546 |
| Aging for 6 weeks at 50° C. | 29037 | 29996 |  |
| Aging for 8 weeks at 50° C. | 29523 | 29439 |  |

These results supported the results in Table 2b, i.e. that whilst Ex. 1 and Ex. 2 silicone polyether polymers were retaining their weight average Molecular weight during aging the siloxane was degrading resulting in a significant decrease in viscosity which showed a lack of stability of the catalyst package.

In the following Table the adhesion to substrate surfaces was assessed by determining the lap shear tensile strength and the failure type (Adhesive/cohesive) as discussed below.

Lap Shear Tensile Strength

The catalyst package was aged for 7 days at room temperature. The base component and catalyst package were then mixed in a 10:1 ratio and Samples of a pre-determined amount of the composition were applied onto a pre-cleaned first substrate surface in a laminating apparatus. A second substrate was the placed on top of the composition applied to the first substrate to give a pre-sized lap. The two substrates were compressed and excess composition was removed. The samples were cured at a temperature of 80° C.

for a period of 30 minutes after which the lap shear tensile strength was determined by pulling apart by shear rather than peel (180° pull) at a rate of 5.1 cm/min.

Adhesive/Cohesive Failure

Adhesive failure (AF) refers to the situation when a sample detaches cleanly (peels off) from a substrate surface. Cohesive failure (CF) is observed when the coating itself breaks without detaching form the substrate surface. In most cases cohesive failure was observed on the previously pulled apart laminates. In some cases a mixed failure mode has been observed: i.e. some areas peel-off (i.e. AF) while some remain covered with coating (i.e. CF). In such instances the portion displaying CF (% CF) is recorded (bearing in mind % CF+% AF=100%). In this example the catalyst package was mixed with base 1.

TABLE 3b

|  | Ex. 1 | Ex. 2 |
|---|---|---|
| Snap time (min) | 3 | 3 |
| Lap shear tensile strength (Adhesion build-up at Glass/Glass, interface) (kPa) | 1053 | 688 |
| Cohesive Failure on glass (%) | 77 | 87 |
| Lap shear Tensile Strength (Adhesion build-up at Glass/PBT interface) (KPa) | 844 | 907 |
| Cohesive Failure on glass (%) | 100 | 90 |
| Cohesive Failure on PBT (%) | 10 | 27 |
| Lap Shear Tensile Strength (Adhesion build-up at Glass/Aluminium interface), (KPa) | 1674 | 1320 |
| Cohesive Failure on glass (%) | 100 | 83 |
| Cohesive Failure on aluminium (%) | 100 | 100 |

For the avoidance of doubt PBT is polybutylene terephthalate. The adhesion test with PBT gave apparently low results but these are standard for untreated PBT and the experiment was not repeated on activated PBT.

The invention claimed is:

1. A two-component moisture curing silicone composition having a base component and catalyst package component, wherein the catalyst package component comprises:
(i) silicone organic copolymer having at least two hydroxy- or alkoxy groups per molecule, and comprising at least one organic polymer block selected from the group consisting of polyether, hydrocarbon, acrylate, polyurethane, and polyurea;
(ii) at least one dipodal silane with the general formula:

$(R^4O)_m(Y^1)_{3-m}Si(CH_2)_x—((NHCH_2CH_2)_t—Q(CH_2)_x—Si(OR^4)_m(Y^1)_{3-m}$, where each $R^4$ is independently a $C_{1-10}$ alkyl group, each $Y^1$ is independently a $C_{1-8}$ alkyl group, Q is a heteroatom containing moiety with a lone pair of electrons, each x is independently an integer of from 1 to 6, t is 0 or 1, and each m is independently 1, 2 or 3;
(iii) a non-dipodal adhesion promoter;
(iv) a tin based catalyst; and optionally
(v) a cross-linker.

2. The two-component moisture curing silicone composition in accordance with claim 1, wherein the base component comprises:
(a) a siloxane polymer having at least two terminal hydroxyl or hydrolysable groups and a viscosity of from 1000 to 200,000mPa·s at 25° C.;
(b) at least one reinforcing filler; and optionally
(c) at least one non-reinforcing filler.

3. The two-part moisture curing composition in accordance with claim 2, wherein the siloxane polymer (a) is present in the composition in an amount of from 10 to 90 weight % based on the total weight of the base component.

4. The two-part moisture curing composition in accordance with claim 2, wherein the reinforcing filler (b) is selected from the group consisting of fumed silicas, precipitated silicas, precipitated calcium carbonate, and combinations thereof.

5. The two-part moisture curing composition in accordance with claim 2, wherein the base component comprises:
10 to 90 weight % of the siloxane polymer (a);
10 to 80 weight % of the reinforcing filler (b); and
0 to 20 weight % of the non-reinforcing filler (c);
with the total weight % of the base component being 100 weight %.

6. The two-part moisture curing composition in accordance with claim 1, wherein the dipodal silane (ii) is selected from the group consisting of bis (trialkoxysilylalkyl) amines, bis (dialkoxyalkylsilylalkyl) amines, bis (trialkoxysilylalkyl) N-alkylamines, bis (dialkoxyalkylsilylalkyl) N-alkylamines, bis (trialkoxysilylalkyl) ureas, bis (dialkoxyalkylsilylalkyl) ureas, and combinations thereof.

7. The two-part moisture curing composition in accordance with claim 1, wherein the dipodal silane (ii) is selected from the group consisting of bis (3-trimethoxysilylpropyl) amine, bis (3-triethoxysilylpropyl) amine, bis (4-trimethoxysilylbutyl) amine, bis (4-triethoxysilylbutyl) amine, bis (3-trimethoxysilylpropyl) N-methylamine, bis (3-triethoxysilylpropyl) N-methylamine, bis (4-trimethoxysilylbutyl) N-methylamine, bis (4-triethoxysilylbutyl) N-methylamine, bis (3-trimethoxysilylpropyl) urea, bis (3-triethoxysilylpropyl) urea, bis (4-trimethoxysilylbutyl) urea, bis (4-triethoxysilylbutyl) urea, bis (3-dimethoxymethylsilylpropyl) amine, bis (3-diethoxymethyl silylpropyl) amine, bis (4-dimethoxymethylsilylbutyl) amine, bis (4-diethoxymethyl silylbutyl) amine, bis (3-dimethoxymethylsilylpropyl) N-methylamine, bis (3-diethoxymethyl silylpropyl) N-methylamine, bis (4-dimethoxymethylsilylbutyl) N-methylamine, bis (4-diethoxymethyl silylbutyl) N-methylamine, bis (3-dimethoxymethylsilylpropyl) urea, bis (3-diethoxymethyl silylpropyl) urea, bis (4-dimethoxymethylsilylbutyl) urea, bis (4-diethoxymethyl silylbutyl) urea, bis (3-dimethoxyethylsilylpropyl) amine, bis (3-diethoxyethyl silylpropyl) amine, bis (4-dimethoxyethylsilylbutyl) amine, bis (4-diethoxyethyl silylbutyl) amine, bis (3-dimethoxyethylsilylpropyl) N-methylamine, bis (3-diethoxyethyl silylpropyl) N-methylamine, bis (4-dimethoxyethylsilylbutyl) N-methylamine, bis (4-diethoxyethyl silylbutyl) N-methylamine, bis (3-dimethoxyethylsilylpropyl) urea, bis (3-diethoxyethyl silylpropyl) urea, bis (4-dimethoxyethylsilylbutyl) urea, bis (4-diethoxyethyl silylbutyl) urea, and combinations thereof.

8. The two-part moisture curing composition in accordance with claim 1, wherein the dipodal silane (ii) has the general formula:

$(R^4O)_3Si—(CH_2)_x—(NHCH_2CH_2)_t—NH(CH_2)_x—Si(OR^4)_3$, where each of $R^4$, x, and t is as defined above.

9. The two-part moisture curing composition in accordance with claim 1, wherein the dipodal silane (ii) is selected from the group consisting of bis (3-tripropyloxysilypropyl) amine, bis (3-methyldiethoxysilypropyl) amine, bis (3-methyldimethoxysilypropyl) amine, bis (3-triethoxysilylpropyl) amine, bis (3-trimethoxysilylpropyl) amine, N,N'-bis [(3-trimethoxysilyl) propyl] ethylenediamine, and combinations thereof.

10. The two-part moisture curing composition in accordance with claim 1, wherein the weight ratio of the base component to the catalyst package component, when mixed, is between 15:1 and 1:1.

11. A one-part moisture curing composition comprising a mixture of the base component and the catalyst package component in accordance with the two-part moisture curing composition of claim 1.

12. The two-part moisture curing composition in accordance with claim 1, wherein the catalyst package component comprises:
- 30 to 80 weight % of the silicone organic copolymer (i);
- 5 to 50 weight % of the dipodal silane (ii);
- 5 to 25 weight % of the non-dipodal adhesion promoter (iii);
- 0.01 to 3 weight % of the tin based catalyst (iv); and
- 0 to 25 weight % of the cross-linker (v);
- with the total weight % of the catalyst package component being 100 weight %.

13. An article comprising a composition or a reaction product thereof, wherein the composition is the two-part moisture curing composition in accordance with claim 1.

14. The article in accordance with claim 13, wherein the composition or reaction product thereof is further defined as a material selected from the group consisting of coating materials, caulking materials, mold making materials, encapsulating materials, and combinations thereof.

15. The two-part moisture curing composition in accordance with claim 1, wherein the silicone-organic copolymer (i) comprises an alternating copolymer, a block copolymer, or a rake-type copolymer.

* * * * *